United States Patent Office 2,798,862
Patented July 9, 1957

2,798,862
STABILIZATION OF RUBBER WITH DIHYDRO-CARBONTIN DIALCOHOLATES OR DIPHENO-LATES

Louis A. Tomka, Westfield, N. J., and Elliott L. Weinberg, New York, N. Y., assignors to Metal & Thermit Corporation, New York, N. Y., a corporation of New Jersey No Drawing. Application January 29, 1954,
Serial No. 407,155

23 Claims. (Cl. 260—45.75)

The present invention relates to the stabilization of elastomers against degradation brought about by aging, especially of rubber compounds of the class consisting of natural rubber and rubbery synthetic polymers. Such properties of the elastomers as elongation, tensile strength, modulus, tackiness, surface crackings, etc., are adversely affected by aging in the absence of stabilizers normally termed rubber anti-oxidants.

It has been found that the incorporation of hydrocarbontin alkoxides, polyalkoxides, aryloxides, polyaryloxides and derivatives of hydroxy-carboxylic acid esters stabilizes natural rubber and rubbery synthetic polymers in a highly effective manner.

Hydrocarbontin compounds of the general type $$R_nSn(OR')_{4-n}$$

are particularly effective stabilizers against degradation due to aging for natural rubber and rubbery synthetic polymers. In the above generalized formula for these hydrocarbontin stabilizers, R is an organic radical, such as alkyl, aralkyl or aryl connected directly to the tin atom, n is 1, 2 or 3 and R' is an aliphatic or aromatic hydrocarbon, substituted or unsubstituted, the (OR') group being similarly connected directly to the tin atom. Included among the substitutions which are satisfactory are oxygen, hydroxyl, carboxylate and aryloxy groups.

For example, where n=2, R' may represent unconnected aryl or alkyl groups, in which case the compound would have the following graphic formula:

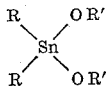

In the above formula, where R and R' are butyl groups, the following compound is obtained:

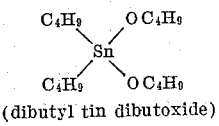
(dibutyl tin dibutoxide)

Alternately, when n=2, R' may represent linked alkyl or aryl groups (as in a glycol for example) in which case the compound would either have the formula

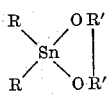

or the corresponding linear polymer structure with the repeating unit

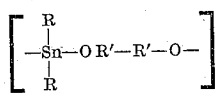

In the above formula, when R is a butyl group and R' is a methylene group, the following compound or the polymer may be obtained:

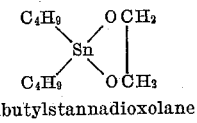
(dibutylstannadioxolane)

Additionally, when n=1, R' may represent a combination of unconnected aryl or alkyl groups and linked groups:

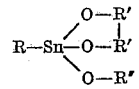

R'' represents an alkyl, aryl or aralkyl group.

Compounds coming under the generic formula may be prepared in any suitable manner. For example, dialkyl, diaryl or alkyl aryl tin dialkoxides may be prepared in high yield and purity by reacting dialkyl, diaryl or alkyl aryl tin dihalides with alkali metal alkoxides in anhydrous medium and recovering the reaction product.

Among the hydrocarbon tin derivatives that may be employed are those having methyl, ethyl, butyl, propyl, lauryl, tolyl, phenyl, phenylethyl, diphenyl or benzyl groups attached directly to tin atoms.

Among the alkoxides that may be employed are methoxide, ethoxide, propoxide, butoxide, pentoxide, hexoxide, heptoxide, octoxide, nonoxide and decoxide. Also included are the alkoxides of glycols and glycerol as well as of the partial esters of these polyhydric alcohols.

Among the alcohols that may be employed in forming the derivatives of hydroxy-carboxylic acid esters are methanol, ethanol, propanol, glycerol, butanol, lauryl alcohol, allyl alcohol, phenol, cresol.

Among the hydroxy-carboxylic acids that may be employed in forming the derivatives of hydroxy-carboxylic acid esters are ricinoleic acid, hydroxy stearic acid, lactic acid, beta-hydroxy butyric acid, alpha-hydroxypropionic acid, beta-hydroxypropionic acid, malic acid, citric acid, tartaric acid and salicylic acid.

The hydrocarbontin derivatives described above are extremely effective rubber stabilizers against the effects of aging, as demonstrated by their stabilizing ability at exceptionally low concentrations. Whereas many stabilizers require a concentration above two percent to be effective, the hydrocarbontin derivatives forming the subject matter of the present invention are effective at less than the 0.1 percent concentration level. These derivatives would normally be used in concentrations of 0.1 percent to 1.0 percent based on the weight of rubber, but .05 percent to 5 percent may also be used.

The hydrocarbontin derivatives described above do not cause discoloration of rubber stocks as do some stabilizers commonly employed. This property of the hydrocarbontin derivatives described above permits the manufacture of white stocks which do not discolor.

The hydrocarbontin derivatives described can be effectively used as stabilizers against aging with elastomers and more specifically with rubbery materials of the class consisting of:
(a) Natural rubber
(b) Rubber-like copolymers of 1,3 butadiene and styrene (GR–S type)
(c) Rubber-like copolymers of 1,3 butadiene and acrylonitrile (nitrile type), and
(d) Rubber-like homopolymers of chloroprene (Neoprene type)

The hydrocarbontin derivatives may be milled into the rubber materials defined above without other additions for the purpose of preventing degradation during storage.

More commonly, they will be incorporated with other materials during compounding.

Any suitable compounding formulation may be employed. A specific example of a natural rubber composition in which the hydrocarbontin derivatives described are effective as stabilizers against aging is as follows:

| | Parts by weight |
|---|---|
| Thin, pale crepe | 100.0 |
| Zinc oxide (lead free) | 5.0 |
| Stearic acid | 1.0 |
| Titanium dioxide (anatase) | 10.0 |
| Insoluble sulfur | 3.0 |
| Benzothiazyl disulfide | 1.0 |
| Tetramethylthiuram disulfide | 0.1 |

To this composition may be added any of the hydrocarbontin derivatives set forth in the specific examples above in the proportions of 0.05 percent to 5 percent by weight, based on the weight of the rubber ingredient of said composition and preferably in the approximate 0.1 percent to 1.0 percent level. This compounded rubber composition containing the stabilizer is worked and blended by conventional techniques and vulcanized at 275 degrees F. for 20 minutes in an hydraulic press.

The effectiveness of these hydrocarbontin derivatives as stabilizers is indicated by the following test results carried out with the specific rubber composition described above containing stabilizers in the amounts and manner shown below.

Example 1: No stabilizer.
Example 2: Dibutyltin dibutoxide 0.25 pt.
Example 3: Dibutyltin 0,0' bis (methyl ricinoleate) 0.50 pt.
Example 4: Dibutylstannadioxolane 0.50 pt.
Example 5: Dimethyltin 0,0' bis (glyceryl dilaurate) 0.50 pt.
Example 6: Commercial stabilizer 1 pt.

The test methods employed to determine the antioxidant properties consisted of (1) outdoor exposure and (2) the oxygen bomb test—ASTM procedure D-572-48. The outdoor exposure test samples were examined for tackiness, surface checking and discoloration. The oxygen bomb test samples were examined for changes in tensile strength, elongation and modulus with standard equipment.

The results of the tests on the examples described above were as follows:

*Outdoor exposure—60 days*

| Sample | Color | Tackiness | Surface Checking |
|---|---|---|---|
| Ex. 1 | No discoloration | Pronounced | Pronounced. |
| Ex. 2 | do | None | Very slight. |
| Ex. 3 | do | do | Do. |
| Ex. 4 | do | do | Do. |
| Ex. 5 | do | do | Do. |
| Ex. 6 | Discolored | Slight | Pronounced. |

*Oxygen bomb test—4 days @ 70° C.*

| Sample | Modulus (p. s. i.) | | | | Percent Elongation | |
|---|---|---|---|---|---|---|
| | 200% Elongation | | Tensile Strength | | | |
| | Orig. | Aged | Orig. | Aged | Orig. | Aged |
| Ex. 1 | 270 | 270 | 2,980 | 1,300 | 600 | 500 |
| Ex. 2 | 270 | 305 | 2,950 | 2,450 | 645 | 550 |
| Ex. 3 | 295 | 305 | 3,000 | 2,450 | 645 | 550 |
| Ex. 4 | 235 | 300 | 3,000 | 2,500 | 625 | 520 |
| Ex. 5 | 250 | 300 | 3,050 | 2,550 | 645 | 525 |
| Ex. 6 | 250 | 315 | 3,210 | 2,400 | 645 | 525 |

Similar tests on GR-S rubber (1,3 butadiene-styrene) indicate that the stabilization of synthetic rubber with organotin derivatives of the general type described, is just as pronounced as it is in the case of natural rubber.

Although the examples show the stabilizer used with natural rubber crepe and with coagulated GR-S (1,3 butadiene and styrene), incorporation of the stabilizer into latices is possible. The latices would then be processed in the usual manner.

The rubber composition to be stabilized may contain quantities of pigments to impart any desired color or decorative effect to the final product. The stabilizer will cause the rubber composition to maintain its color whether it is black, white or any other color.

While the invention has been described with reference to various examples and embodiments, it will be apparent to those skilled in the art that various modifications may be made and equivalent substituted therefor without departing from the principles and true nature of the invention.

What is claimed is:

1. A rubber composition comprising as a principal ingredient a rubber selected from the class consisting of natural rubber and copolymers of 1,3 butadiene and styrene, and a stabilizing amount of a dihydrocarbontin compound containing a single tin atom and selected from the class consisting of dihydrocarbontin dialcoholates and dihydrocarbontin diphenolates, said alcoholate radicals being derived from an alcohol selected from the class consisting of monohydric alkyl alcohols, dihydric aliphatic hydrocarbon alcohols, trihydric aliphatic alcohol partial esters of fatty acids, and aliphatic hydrocarbon esters of a hydroxy fatty acids by the removal of hydrogen from the alcoholic OH, and the phenolate radical being derived from a phenol by the removal of hydrogen from the phenolic OH group.

2. A composition according to claim 1 wherein the composition is cured.

3. A composition according to claim 1 wherein said dihydrocarbontin compound is present in the range of about .05 to 5% by weight based on the weight of rubber ingredient.

4. A rubber composition comprising as a principal ingredient a copolymer of 1,3 butadiene and styrene and a stabilizing amount of a dihydrocarbontin dialkoxide.

5. A composition according to claim 4 wherein said dihydrocarbontin dialkoxide is a dialkyltin dialkoxide.

6. A composition according to claim 5 wherein said dialkyltin dialkoxide is present in the range of about .05 to 5% by weight based on rubber ingredient.

7. A composition according to claim 6 wherein said dialkyltin dialkoxide is dibutyltin dibutoxide.

8. A composition according to claim 7 wherein said dibutyltin dibutoxide is present in the range of about .1 to 1% by weight based on rubber ingredient.

9. A rubber composition comprising as a basic ingredient a copolymer of 1,3 butadiene and styrene and a stabilizing amount of a dihydrocarbontin dialcoholate of an aliphatic hydrocarbon dihydric alcohol.

10. A composition according to claim 9 wherein said dihydrocarbontin dialcoholate is a dialkyltin dialcoholate of an aliphatic hydrocarbon dihydric alcohol.

11. A composition according to claim 10 wherein said dialcoholate is present in the range of about .05 to 5% by weight based on rubber ingredient.

12. A composition according to claim 11 wherein said dialcoholate is dibutylstannadioxolane.

13. A composition according to claim 12 wherein said dialcoholate is present in the range of about .1 to 1% based on the weight of rubber ingredient.

14. A rubber composition comprising as a principal ingredient a copolymer of 1,3 butadiene and styrene and a stabilizing amount of a dihydrocarbontin dialcoholate of an aliphatic hydrocarbon ester of an aliphatic hydroxy fatty acid.

15. A rubber composition according to claim 14 wherein said dialcoholate is a dialkyltin dialcoholate of an alkyl ester of a monohydroxy long chain fatty acid.

16. A composition according to claim 15 wherein said dialcoholate is present in the range of about .05 to 5% by weight based on rubber ingredient.

17. A composition according to claim 16 wherein said dialcoholate is dibutyltin O,O' bis(methyl recinoleate).

18. A composition according to claim 17 wherein said dialcoholate is present in the range of about .1 to 1% by weight based on rubber ingredient.

19. A rubber composition comprising as a basic ingredient a copolymer of 1,3 butadiene and styrene and a stabilizing amount of a dihydrocarbontin dialcoholate of a trihydric aliphatic alcohol partial ester of a fatty acid.

20. A composition according to claim 19 wherein said dialcoholate is a dialkyltin dialcoholate of a glycerol ester of a fatty acid wherein two OH groups of the glycerol are esterified.

21. A composition according to claim 20 wherein said dialcoholate is present in the range of about .05 to 5% by weight based on rubber ingredient.

22. A composition according to claim 21 wherein said dialcoholate is dimethyltin O,O' bis (glyceryl dilaurate).

23. A composition according to claim 22 wherein said dialcoholate is present in the range of about .1 to 1% by weight based on rubber ingredient.

References Cited in the file of this patent

UNITED STATES PATENTS

| | | |
|---|---|---|
| 2,476,661 | Hart | July 19, 1949 |
| 2,489,518 | Burt | Nov. 29, 1949 |
| 2,592,926 | Mack et al. | Apr. 15, 1952 |
| 2,641,596 | Leistner et al. | June 9, 1953 |
| 2,648,650 | Weinberg et al. | Aug. 11, 1955 |